United States Patent [19]
Lorriette

[11] Patent Number: 5,701,986
[45] Date of Patent: Dec. 30, 1997

[54] WET CLUTCH ASSEMBLY

[75] Inventor: Patrick Lorriette, Jaux, France

[73] Assignee: Massey-Ferguson SA, France

[21] Appl. No.: 580,009

[22] Filed: Dec. 20, 1995

[30] Foreign Application Priority Data

Dec. 24, 1994 [GB] United Kingdom ............... 9426248
Jan. 30, 1995 [GB] United Kingdom ............... 9501753

[51] Int. Cl.$^6$ .................... F16D 25/0638; F16D 13/74
[52] U.S. Cl. .................... 192/70.12; 192/70.27; 192/91 A; 192/113.35
[58] Field of Search .............. 192/70.12, 70.27, 192/91 A, 91 R, 113.34, 113.35

[56] References Cited

U.S. PATENT DOCUMENTS

| | | |
|---|---|---|
| 4,069,904 | 1/1978 | Garrett et al. . |
| 4,091,905 | 5/1978 | Sieren et al. . |
| 4,172,511 | 10/1979 | Khuntia et al. ............... 192/70.27 X |
| 4,267,911 | 5/1981 | Cory ............... 192/113.34 X |
| 4,573,561 | 3/1986 | Deem et al. . |
| 4,646,889 | 3/1987 | Hoffman et al. . |
| 4,693,350 | 9/1987 | Sommer ............... 192/113.34 X |
| 4,776,444 | 10/1988 | Worner et al. . |
| 4,802,564 | 2/1989 | Stodt . |
| 4,899,861 | 2/1990 | Cummings, III ............... 192/85 AA |
| 4,934,502 | 6/1990 | Horsch . |
| 5,090,539 | 2/1992 | Wolf et al. . |
| 5,261,517 | 11/1993 | Hering ............... 192/91 A |
| 5,284,232 | 2/1994 | Prud'Homme . |
| 5,538,121 | 7/1996 | Hering ............... 192/70.12 |

FOREIGN PATENT DOCUMENTS

| | | |
|---|---|---|
| 095841 | 12/1983 | European Pat. Off. . |
| 955852 | 4/1964 | United Kingdom . |
| 1136872 | 12/1968 | United Kingdom . |
| 1255003 | 11/1971 | United Kingdom . |
| 1365393 | 9/1974 | United Kingdom . |
| 1483860 | 8/1977 | United Kingdom . |
| 2191252 | 12/1987 | United Kingdom . |
| 91/00784 | 1/1991 | WIPO . |

*Primary Examiner*—Andrea L. Pitts
*Attorney, Agent, or Firm*—MacMillan, Sobanski & Todd

[57] ABSTRACT

A wet clutch assembly comprises a stack of clutch members enclosed into a cover. An oil inlet communicates with the interior of the cover at or near the radial center, whilst an oil outlet communicates with the interior at a point near the periphery, adjacent a shoulder in the interior peripheral surface. Oil entering the cover is propelled outwardly and around the interior peripheral surface by the rotation of the clutch members, and builds up against the shoulder creating pressure to expel the oil.

2 Claims, 2 Drawing Sheets

WET CLUTCH ASSEMBLY

BACKGROUND TO THE INVENTION

The present invention relates to a wet clutch assembly.

Wet clutch assemblies, that is incorporating clutches in which oil is used to cool and lubricate the clutch plates are well known. The clutches can be pressure engaged and spring disengaged, as is usually the case for high horse power applications, or they can be spring engaged and pressure disengaged as in this case, for use in lower horse power applications.

Known wet clutch assemblies suffer from the disadvantage that there is a tendency for oil to build up in the clutch cover. If this is not removed efficiently, the clutch then has to rotate in the oil pooled in the cover, causing drag and a loss of efficiency.

It is an aim of the present invention to provide an improved wet clutch assembly.

SUMMARY OF THE INVENTION

The invention provides a wet clutch assembly comprising a plurality of interleaved clutch members enclosed within a cover, an oil inlet communicating with the interior of the cover being located towards the radial centre of the cover, and an oil outlet, also communicating with the interior of the cover, being located in the radially outer region of the cover whereby oil is propelled by the rotational motion of the clutch members from the region of the inlet to the region of the outlet, characterised in that the outlet is adjacent to a step or shoulder in the internal surface of the periphery of the cover, whereby oil travelling around the said internal surface under the influence of the rotating clutch members builds up adjacent the step.

In practice, an inlet duct for oil will normally be provided which may be integrally formed with the cover and lead from the radially outer region of the cover, but communication of the duct with the cover interior in this case will still be near the radial centre.

In practice, oil impinging on the step causes a build up of static pressure which propels the oil out of the outlet. Normally, the cover would be generally circular in cross-section, and a portion of the internal surface to one side of the step would have a greater diameter than the remainder of the internal surface of the cover periphery or would be at a tangent to the remainder of the internal surface. A "lead in" to the step is thereby created. Preferably, the outlet is directed axially.

DETAILED DESCRIPTION

Figure 1:
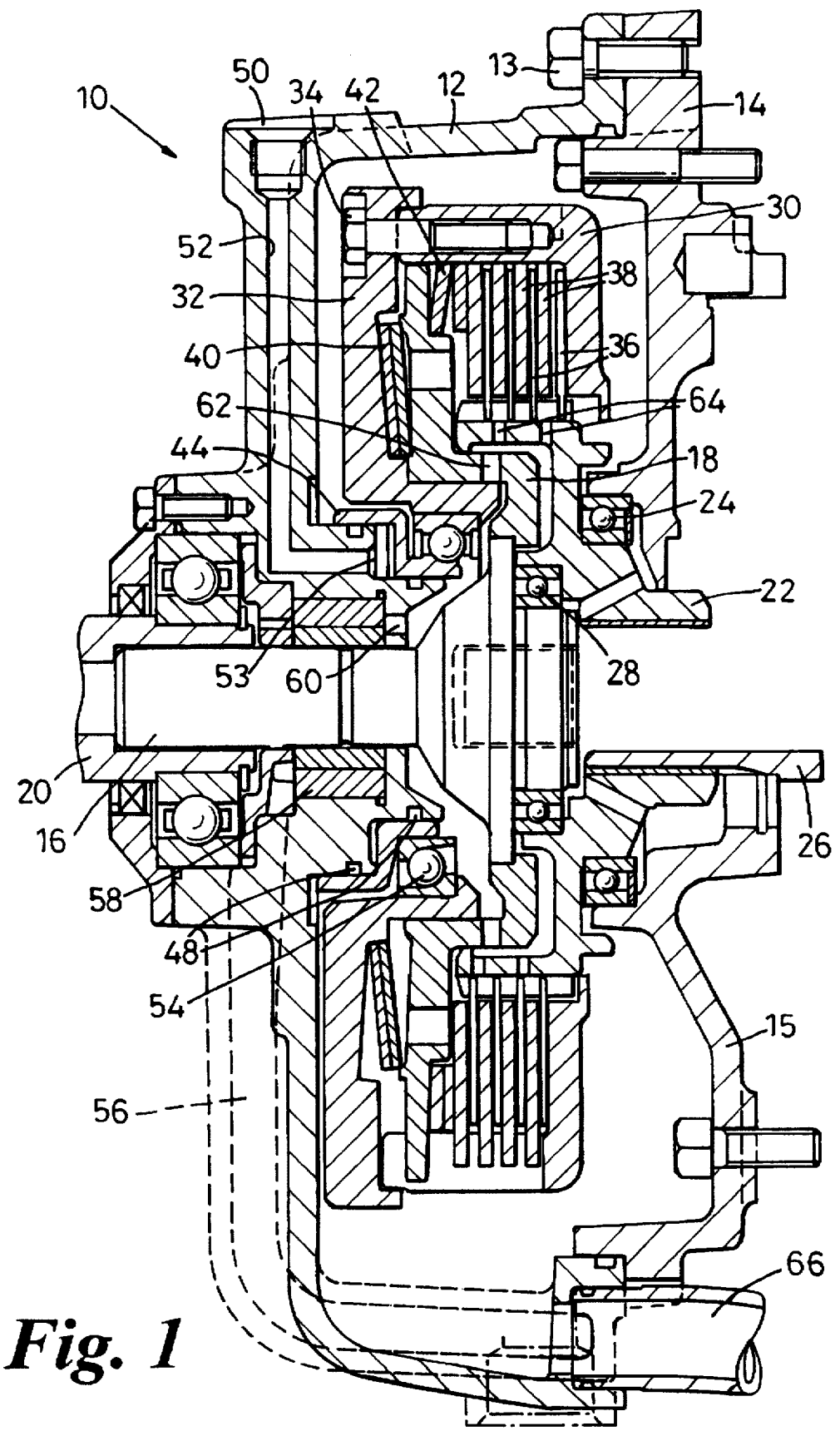
FIG. 1 shows a vertical cross-section through a clutch assembly according to the present invention, with the components shown with the clutch released in the upper half and engaged in the lower half.
Figure 2:
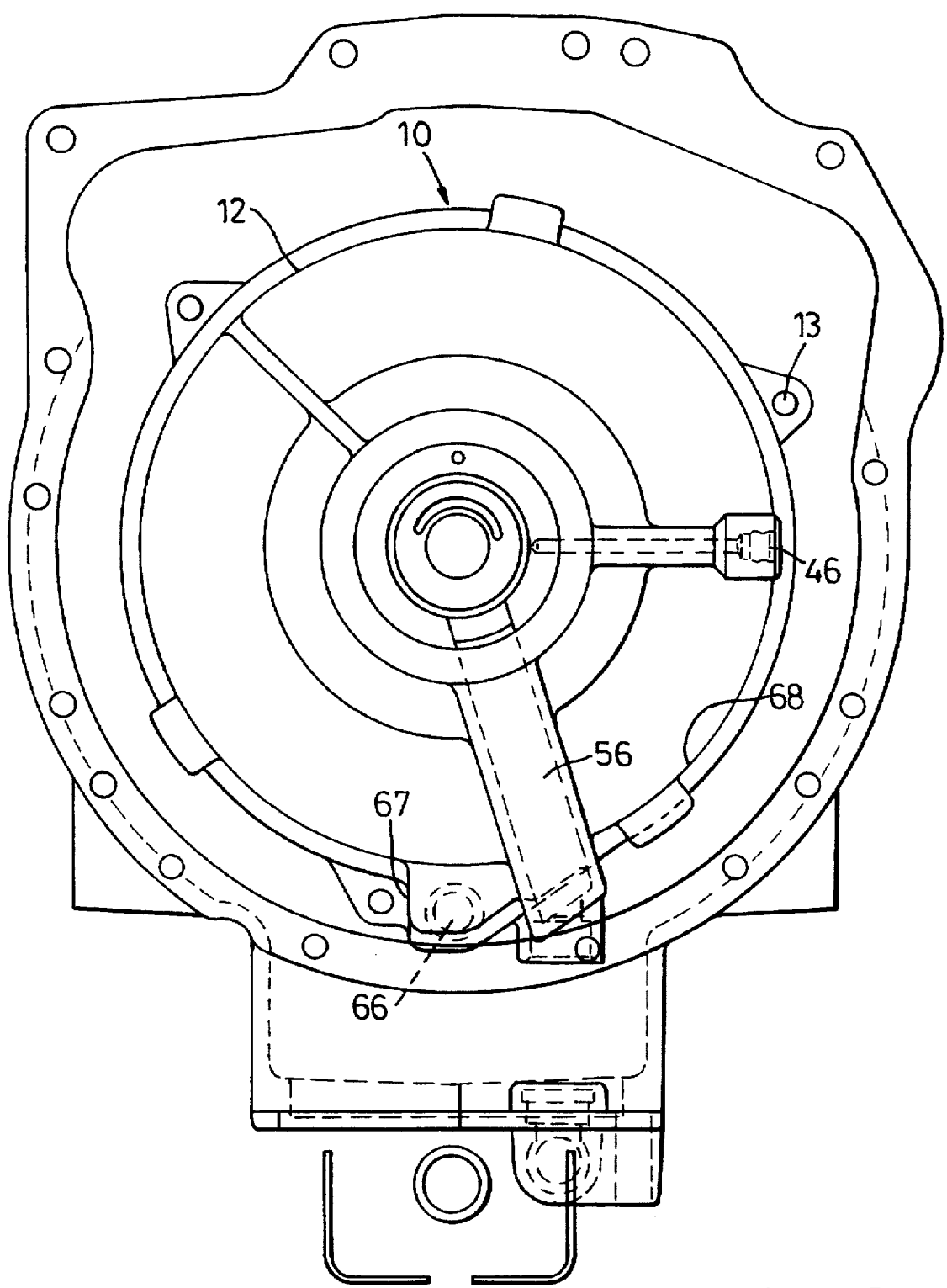
FIG. 2 shows a front view of the clutch assembly of FIG. 1.

Referring to FIGS. 1 and 2, a clutch assembly 10 includes a clutch cover 12 and a mounting plate 14 bolted together by bolts 13. Input is by means of a clutch drive shaft 16 and clutch drive plate 18 driven by an input shaft 20, which is the power take off drive shaft. The clutch drive shaft 16 incorporates splines for connection to the input shaft 20. Output is by means of a clutch output hub 22, located on the mounting plate 14 via a clutch hub bearing 24, and splined to an output shaft 26. A thrust bearing 28 is located between the clutch drive shaft 16 and the clutch output hub 22. The clutch hub bearing and thrust bearing are both combined seals and bearings of a form described in co-pending U.S. patent application Ser. No. 08/446,956.

A clutch drum 30 and pressure plate 32, located between the clutch cover 12 and mounting plate 14, are bolted together by bolts 34 and are connected for rotation with the clutch drive shaft 16 but not with the clutch output hub 22. Between the clutch drum 30 and pressure plate 32 are a number of friction discs 36, connected for rotation with the clutch output hub 22, and interleaved with an equal number of intermediate counterplates 38, connected for rotation with the clutch drum 30. Engagement Belleville springs 40 are located between the clutch drive plate 18 and the pressure plate 32. Cushion Belleville springs 42 which provide for progressive engagement of the clutch are located between the clutch drive plate 18 and the first of the counterplates 38. The engagement and cushion Belleville springs 40 and 42 are selected as appropriate for the application for which the clutch assembly 10 is designed. FIG. 1 shows two Belleville springs in each location, however, the number used is also selected as appropriate for the application. Multiple cushion springs allow for, eg., very sensitive control as the clutch is initially engaged, followed by less sensitive control as the clutch pedal is further depressed. In an alternative design, progressive engagement could be provided in some other way, for example with the discs and counterplates biased against the pressure plate by the resilience of the clutch drum 30.

A clutch release piston 44 is located inside the clutch cover 12 but outside the clutch drum 30. The piston 44 does not rotate permitting use of standard non-rotational seals in the form of o-rings. Pressurised hydraulic fluid for operation of the piston 44 is supplied from a clutch master cylinder (not shown) via a control port 50 and bore 52 in the clutch cover 12 to an inlet 53. The clutch release piston 44 acts on the pressure plate 32 via an axial clutch release bearing 54. The bearing 54 and piston 44 may be made as an integral unit (as shown in the upper half of FIG. 1) or as two separate items (as shown in the lower half of FIG. 1).

Oil for cooling and lubrication of the clutch discs 36 and counterplates 38 is supplied from a sump (not shown) via an oil supply tube 56 (shown in dashed lines in FIG. 1 and solid lines in FIG. 2) and a pump 58 located around the clutch drive shaft 16. The rotation of the clutch forces the oil outwards and it passes from the pump 58 through a passage 60 in the clutch cover 12, through passages 62 in the clutch drive plate 18 and then through passages 64 in the clutch output hub 22 to the clutch discs 36 and counterplates 38. After the oil has passed between the discs 36 and counterplates 38 it is forced outwards to the inner surface of the clutch cover 12 and then flows around the clutch cover under the influence of the rotating clutch drum 30 and passes out of the clutch cover 12 along oil outlet tube 66. As can be seen in FIG. 2, the oil outlet tube 66 is located adjacent a shoulder 67. Oil flowing around the inner surface of the clutch 12 in the clockwise direction in FIG. 2 impinges on the shoulder 67 causing a build up of static pressure and thereby forcing the oil out of the outlet tube 66. From the point identified by reference number 68 in FIG. 2, the clutch cover 12 is non-circular, providing a lead-in to the shoulder 67.

The operation of the wet clutch assembly 10 will now be described. Referring to the lower half of FIG. 1, the clutch is shown fully engaged. In this position the friction discs 36 and counterplates 38 are forced into close contact and drive is transmitted from the input shaft 20 to the output hub 22. In addition the oil flows as previously described.

When the operator of the vehicle or machine in which the assembly 10 is incorporated wishes to disengage the clutch the clutch control pedal (not shown) is depressed and operates a clutch master cylinder (not shown). The hydraulic fluid expelled from the clutch master cylinder passes to the clutch release piston 44 via the control port 50 and bore 52. The fluid forces the clutch release piston 44 to move to the right, to the position shown in the upper half of FIG. 1. The movement of the piston 44 also causes the axial bearing 54, clutch drum 30 and pressure plate 32 to move to the right and the engagement Belleville springs 40 to be compressed. The counterplates 38, connected for movement with the clutch drum 32 thus move away from the friction discs 36 and drive is no longer transmitted from the input shaft 16 to the output hub 22.

In intermediate positions of the clutch pedal, the degree of pressure between the clutch discs and counterplates, and therefore the amount of torque transmitted by the clutch, depends on the spring constant(s) of the cushion spring (or springs) 42 and the degree to which the cushion spring 42 is compressed. This is because pressure is only transferred from the pressure plate 32 to the discs and counterplates via the cushion spring 42. A weak cushion spring will therefore allow small changes in torque for relatively large movements of the clutch pedal, until the spring is completely flattened. A stronger cushion will, conversely, allow for a greater rate of change of torque as the clutch pedal is moved. It is envisaged that two or more cushion springs could be provided. The weakest spring would be compressed first, providing a very gradual initial engagement of the clutch, with a stronger spring then taking over to provide a greater rate of increase of torque. Further springs could be added to provide any number of stages.

I claim:

1. A wet clutch assembly comprising a plurality of interleaved clutch members enclosed within a cover, said cover being substantially circular in cross section when viewed along the axis of said assembly, said cover having:

a tangential portion leading up to a generally radially extending shoulder; said tangential portion and said shoulder being integrally formed with said cover;

an oil inlet communicating with an interior of said cover at or near the radial center thereof; and an oil outlet adjacent to said shoulder, wherein oil entering into said cover is propelled radially outwardly by rotational motion of said clutch members and travels circumferentially around said internal surface building up against said shoulder.

2. The wet clutch assembly defined in claim 1 wherein said oil outlet is directed axially.

\* \* \* \* \*